United States Patent
Liu et al.

(10) Patent No.: US 12,203,843 B2
(45) Date of Patent: Jan. 21, 2025

(54) TWO-DIMENSIONAL MULTI-POINT-REFLECTION LONG-OPTICAL-PATH GAS SENSOR PROBE AND GAS SENSOR

(71) Applicant: LASER INSTITUTE, SHANDONG ACADEMY OF SCIENCES, Shandong (CN)

(72) Inventors: Tongyu Liu, Jining (CN); Yanong Ning, Jining (CN); Yanfang Li, Jining (CN); Dehu Li, Jining (CN); Guangxian Jin, Jining (CN); Tingting Zhang, Jining (CN); Wei Zhang, Jining (CN)

(73) Assignee: LASER INSTITUTE, SHANDONG ACADEMY OF SCIENCES, Jining (CN)

( * ) Notice: Subject to any disclaimer, the term of this patent is extended or adjusted under 35 U.S.C. 154(b) by 184 days.

(21) Appl. No.: 17/920,146

(22) PCT Filed: Jan. 13, 2021

(86) PCT No.: PCT/CN2021/071505
§ 371 (c)(1),
(2) Date: Oct. 20, 2022

(87) PCT Pub. No.: WO2021/212931
PCT Pub. Date: Oct. 28, 2021

(65) Prior Publication Data
US 2023/0324281 A1    Oct. 12, 2023

(30) Foreign Application Priority Data

Apr. 23, 2020  (CN) .......................... 202010328154.9

(51) Int. Cl.
*G01N 21/03*    (2006.01)
*G01N 21/25*    (2006.01)
*G01N 21/31*    (2006.01)

(52) U.S. Cl.
CPC ....... *G01N 21/0303* (2013.01); *G01N 21/255* (2013.01); *G01N 21/31* (2013.01)

(58) Field of Classification Search
CPC .. G01N 21/0303; G01N 21/255; G01N 21/31; G01N 21/15; G01N 2021/399;
(Continued)

(56) References Cited

U.S. PATENT DOCUMENTS

| | | | |
|---|---|---|---|
| 2007/0012088 A1* | 1/2007 | Petrovic | G01N 21/0303 250/576 |
| 2007/0078610 A1* | 4/2007 | Adams | G01N 1/26 702/28 |

(Continued)

FOREIGN PATENT DOCUMENTS

| | | |
|---|---|---|
| CN | 105445195 A | 3/2016 |
| CN | 105445196 A | 3/2016 |

(Continued)

OTHER PUBLICATIONS

English Translation of Duan et al CN-108507959-A Description (Year: 2018).*
English Translation of Guo et al CN-209372679-U Description (Year: 2019).*
Apr. 12, 2021 International Search Report issued in International Patent Application No. PCT/CN2021/071505.
Apr. 12, 2021 Written Opinion issued in International Patent Application No. PCT/CN2021/071505.

*Primary Examiner* — Uzma Alam
*Assistant Examiner* — Akbar H. Rizvi
(74) *Attorney, Agent, or Firm* — Oliff PLC

(57) ABSTRACT

A two-dimensional multi-point-reflection long-optical-path gas sensor probe includes: a protecting housing and a multi-point total reflection type long-optical-path module arranged in the protecting housing. The multi-point total reflection type long-optical-path module includes two right-
(Continued)

angle reflecting prisms or mirror pairs spaced at a set distance, and inclined surfaces of the right-angle reflecting prisms or mirror pairs are oppositely arranged and parallel to each other. A set deviation exists between center lines of the two right-angle reflecting prisms or mirror pairs, and the deviation can enable light beams parallel to the center lines to be reflected for a set number of times between the two right-angle reflecting prism or mirror pairs, so as to form a two-dimensional parallel light beam group. Thereby increasing a measurement optical path of gas absorption, which is beneficial to improve the detection signal-to-noise ratio and the measurement accuracy.

8 Claims, 4 Drawing Sheets

(58) Field of Classification Search
CPC ... G01N 2201/0221; G01N 2201/1211; G01N 2201/1218; G01N 21/39; G01N 21/031; G02B 17/04
See application file for complete search history.

(56) References Cited

U.S. PATENT DOCUMENTS

| | | | |
|---|---|---|---|
| 2015/0192517 A1* | 7/2015 | Andre | G01N 21/61 250/343 |
| 2016/0104806 A1* | 4/2016 | Thrush | G01N 21/15 257/434 |
| 2017/0139191 A1* | 5/2017 | Paul | G01N 21/031 |
| 2018/0113065 A1* | 4/2018 | Deng | G01N 21/031 |
| 2020/0018692 A1* | 1/2020 | Singer | G01N 21/0303 |

FOREIGN PATENT DOCUMENTS

| | | | | |
|---|---|---|---|---|
| CN | 107678156 A | | 2/2018 | |
| CN | 108507959 A | * | 9/2018 | ......... G01N 21/0303 |
| CN | 209372679 U | * | 9/2019 | |
| CN | 111537453 A | | 8/2020 | |
| JP | S57-1953 A | | 1/1982 | |
| JP | 2001-188037 A | | 7/2001 | |

* cited by examiner

TWO-DIMENSIONAL MULTI-POINT-REFLECTION LONG-OPTICAL-PATH GAS SENSOR PROBE AND GAS SENSOR

TECHNICAL FIELD

The present disclosure relates to the technical field of laser spectrum gas sensors, and particularly relates to a two-dimensional multi-point-reflection long-optical-path gas sensor probe and a gas sensor.

BACKGROUND

The description in this section merely provides background information related to the present disclosure and does not necessarily constitute the prior art.

In the process of miniaturization, practicality and intelligence of laser spectrum gas sensors, various miniaturized laser spectrum gas sensor probes have appeared. In order to improve the measurement accuracy of the detected gas and reduce the size of a sensor probe, in a measurement gas chamber, a method for changing the propagation path of light beams by reflecting mirrors is widely used in these miniaturized gas sensors. A gas absorption chamber mostly uses the space between a laser source and a detector as a measurement chamber. When the volume of a sensor is limited, in order to increase the length of the measurement optical path, the gas chamber usually uses a plurality of reflecting mirrors to enable the light beams to be reflected for multiple times in the gas chamber, thereby achieving the effect of obtaining a longer measurement optical path in a smaller space. For example, schemes of a White reflection cavity and a Herriott reflection cavity are adopted. A multi-reflection chamber with a typical White structure is a confocal cavity composed of three spherical mirrors, where incident light beams are focused on a spherical mirror A, and after the incident light beams are reflected and focused by a spherical mirror B or C, the focus still falls on the spherical mirror A. A traditional Herriott chamber uses two spherical mirrors (with the same focal length) placed oppositely to form a multi-reflection cavity, and at least one of the two reflecting mirrors has a center hole. The light enters and exits the absorption chamber through the hole in the reflecting mirror, and is reflected for multiple times in the absorption chamber before returning to the entry point. The inventor found that since the above reflection cavities all use a plurality of optical components to form an absorption chamber, the optical structure of the absorption chamber becomes complicated. If the position of any component changes relative to the positions of other components, the optical path will change accordingly, thus affecting the measurement accuracy. In particular, since these sensing optical paths are all distributed in a three-dimensional space, the volume of the entire gas absorption chamber is large, and the mechanical structure strength is poor. Especially, in application sites, such as in coal mines or chemical pipeline systems, gas sensors based on these three-dimensional gas chambers have poor stability and limited service life, which is not conducive to mass applications and widely usage. Therefore, how to design a gas sensor with a sufficiently long absorption optical path and a simple structure is an urgent problem to be solved in the art.

SUMMARY

In order to solve the above problems, the present disclosure provides a two-dimensional multi-point-reflection long-optical-path gas sensor probe and a gas sensor. By adopting a multi-point-reflection scheme of double right-angle prisms, a two-dimensional flat measurement gas chamber is designed, which not only simplifies the optical mechanical structure, but also multiplies the limited measurement optical path, reduces the possibility of change in relative position of each component, reduces the difficulty of adjusting an optical path, and improves the stability of an optical path system.

In some implementations, the following technical solutions are adopted:

According to a first aspect of embodiments of the present disclosure, a two-dimensional multi-point-reflection long-optical-path gas sensor probe is provided, which includes: a protecting housing and a multi-point total reflection type long-optical-path module arranged in the protecting housing. The multi-point total reflection type long-optical-path module includes two right-angle reflecting prisms or reflecting mirror pairs spaced at a set distance, and inclined surfaces of the right-angle reflecting prisms or reflecting mirror pairs are oppositely arranged and parallel to each other. A set deviation exists between center lines of the two right-angle reflecting prisms or reflecting mirror pairs, and the deviation can enable light beams parallel to the center lines to be reflected for a set number of times between the two right-angle reflecting prisms or reflecting mirror pairs, so as to form a two-dimensional parallel light beam group.

According to a second aspect of the embodiments of the present disclosure, a gas sensor is provided, which includes the above-mentioned two-dimensional multi-point-reflection long-optical-path gas sensor probe.

Compared with the prior art, the beneficial effects of the present disclosure are as follows:

(1) According to the principle of total reflection of right-angle prisms, a photoelectric gas sensor probe enables parallel light beams to be totally reflected for multiple times in two right-angle prisms or two pairs of plane reflecting mirrors perpendicular to each other, so as to form a group of two-dimensional parallel light beams, thereby increasing the length of the measurement optical path of gas absorption, which is beneficial to improve the detection signal-to-noise ratio and the measurement accuracy.

(2) Since only two right-angle prism optical devices with parallel inclined surfaces are adopted to realize multiple reflections of an absorption optical path, the possibility of change in relative position of each optical component is greatly reduced, and the stability of the optical path system is significantly improved. Moreover, the volume of the sensor probe is reduced.

(3) Since the total reflection of a prism is used as a reflecting mirror, the optical structure can be applied to light beams with various wavelengths. As a result, for the measurement of different gases, it is only necessary to change a light source to a laser source corresponding to an absorption peak of the gas, so that the same optical structure can be used for measuring different types of gas, so as to realize simultaneous measurement of multiple gases by using the same gas chamber.

(4) Since the absorption optical path is composed of an inner cavity in an integral cube structure, and entrance and exit windows of light beams in two sides of an absorption chamber are treated with an anti-water condensation film, measurement errors caused by the influence of humidity on the optical path can be effectively reduced.

(5) The two right-angle prism optical devices only need to be directly pasted and fixed on a rigid structure, thereby greatly simplifying the manufacturing process of a module, effectively reducing the complexity of production, correspondingly increasing the yield of production, and being beneficial to large-scale production.

In the figures, 1 denotes metal screen, 2 denotes vent hole, 3 denotes upper cover of sensor probe, 4 denotes multi-point total reflection type long-optical-path module, 5 denotes lower cover of sensor probe, 6 denotes signal processing circuit, 7 denotes base, 8 denotes parallel laser source, 9 denotes temperature and pressure sensor, 10 denotes photoelectric detector, and 11 denotes right-angle reflecting prism or reflecting mirror pair.

DETAILED DESCRIPTION

It should be noted that the following detailed descriptions are all exemplary and are intended to provide a further understanding of the present disclosure. Unless otherwise indicated, all technical terms and scientific terms used in this application have the same meaning as commonly understood by a person of ordinary skill in the art to which the present disclosure belongs.

It should be noted that terms used herein are only for describing specific implementations and are not intended to limit exemplary implementations according to the present disclosure. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

The embodiments in the present disclosure and features in the embodiments may be mutually combined in case that no conflict occurs.

Embodiment 1

Figure 1:
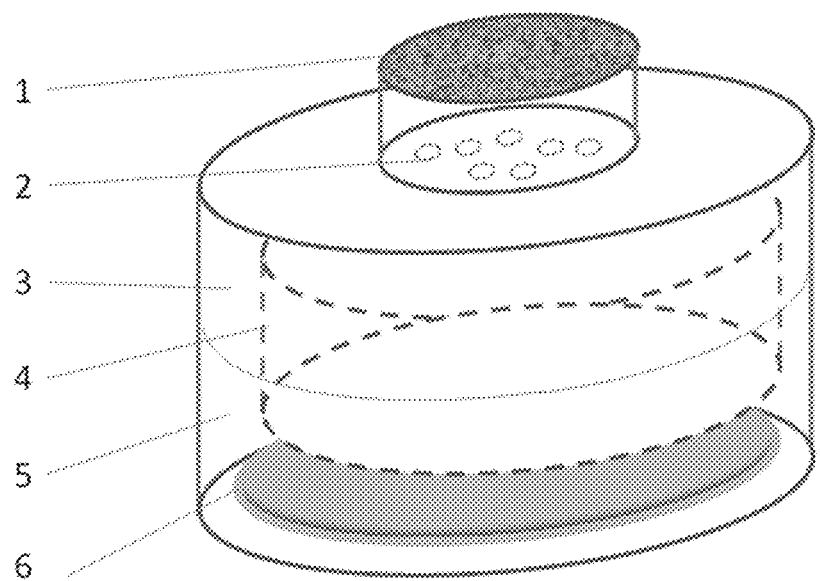
FIG. 1 is a schematic structural view of a photoelectric gas sensor probe provided by an embodiment of the present disclosure.

In one or more implementations, a two-dimensional multi-point-reflection long-optical-path gas sensor probe is disclosed. Referring to FIG. 1, the two-dimensional multi-point-reflection long-optical-path gas sensor probe includes: a protecting housing, a multi-point total reflection type long-optical-path module 4 arranged in the protecting housing, a parallel laser source 8, a photoelectric detector 10 and a gas absorption chamber.

Figure 2A:
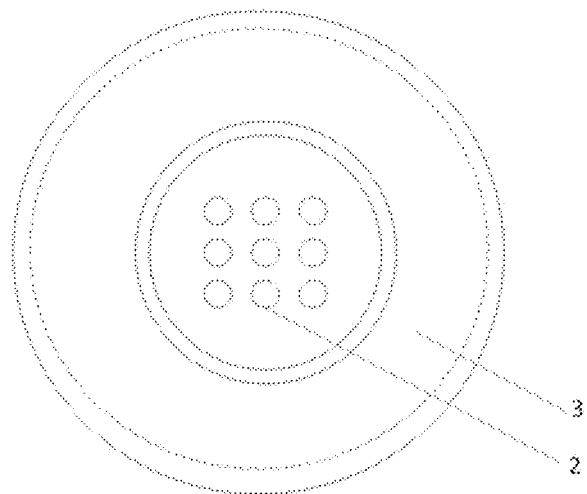
FIG. 2(a)-(b) are respectively a plane view and a side view of an upper cover plate of a photoelectric gas sensor probe provided by an embodiment of the present disclosure.
Figure 2B:
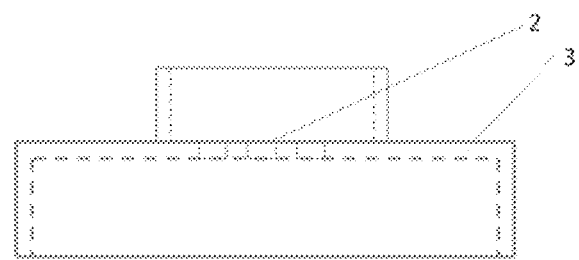

Specifically, referring to FIG. 2(a)-(b), the protecting housing is composed of an upper cover 3 of the sensor probe with an air intake filter device and a lower cover 5 of the sensor probe. A top end of the upper cover 3 of the sensor probe is provided with a replaceable metal screen 1 for preventing dust, impurities and the like from entering the absorption chamber and contaminating optical components in an optical path. A plurality of vent holes 2 are formed under the metal screen 1. The measured gas diffuses from the vent holes 2 into the gas absorption chamber through the metal screen 1.

Figure 3:
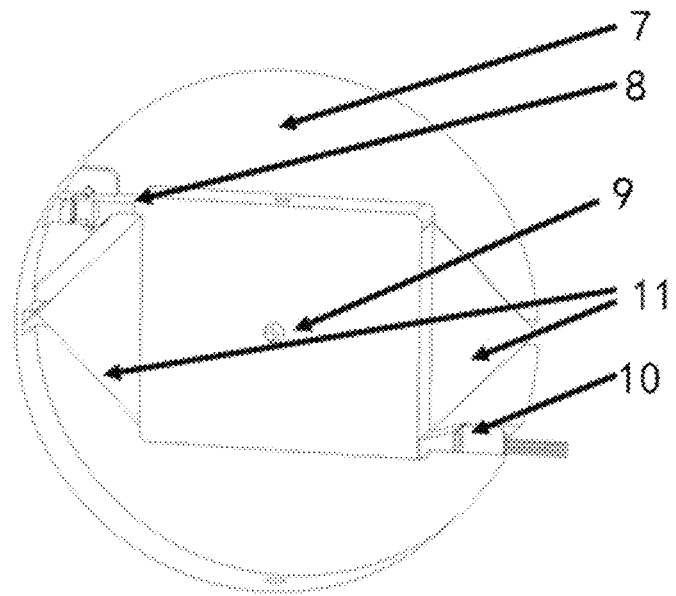
FIG. 3 is a schematic view of a base of an optical path structure provided by an embodiment of the present disclosure.

In this embodiment, referring to FIG. 3, the multi-point total reflection type long-optical-path module 4 includes two identical right-angle reflecting prisms or reflecting mirror pairs 11. It should be noted that the right-angle reflecting prism or reflecting mirror pair 11 may be a right-angle triangular prism, or may be in a form of a triangular reflecting mirror pair consisting of two plane reflecting mirrors perpendicular to each other. Alternatively, those skilled in the art can select other forms of right-angle reflecting prisms or reflecting mirror pairs according to needs.

In this embodiment, the form of the right-angle triangular prism is adopted. Two right-angle triangular prisms are spaced at a set distance and are embedded in a rigid base 7, and inclined surfaces of the two right-angle prisms are placed to be opposite to each other and parallel to each other.

Those skilled in the art can understand that a distance between the inclined surfaces of the two right-angle triangular prisms can be set according to an optical path required by a gas sensor.

Center lines of the two right-angle triangular prisms have a relative deviation value. For a right-angle triangular prism of a certain size, by adjusting the deviation value, a parallel light beam parallel to the center line of the prism can be totally reflected for different numbers of times sequentially in the two prisms, thereby generating different numbers of reflected light beams.

A gas absorption chamber with a cuboid structure in which the measured gas can be introduced is placed in a space between the inclined surfaces of the two right-angle triangular prisms.

Of course, the structure of the gas absorption chamber is not limited to the cuboid structure. Those skilled in the art can adjust the structure according to the needs of different application scenes, such as a cylindrical box-like structure and a rectangular box-like structure.

As an optional embodiment, an entrance window and an exit window of the absorption chamber are flat glass specially treated by anti-water condensation. After the treatment with an anti-water condensation film, measurement errors caused by the influence of humidity on the optical path can be effectively reduced.

A group of two-dimensional parallel light beams generated by double prism multi-point reflection enter and exit the absorption chamber through the flat glass windows in two sides of the absorption chamber, so as to form sensing light beams.

One side surface of the gas absorption chamber with the cuboid structure is provided with a plurality of vent holes 2, and the measured gas diffuses through the metal screen 1 and the vent holes 2 into the gas absorption chamber. A temperature and pressure sensor 9 for measuring temperature and pressure in the gas absorption chamber is mounted in one of the vent holes 2 of the absorption chamber. The temperature and pressure information will be used for compensating for parameter changes due to ambient temperature fluctuations and pressure changes, so as to further improve the ambient temperature and pressure adaptability of the gas measurement.

As an optional embodiment, an inner wall cavity of the gas absorption chamber with the cuboid structure is coated with a black light-absorbing coating, so as to reduce the influence of stray light and play a role of corrosion prevention.

Figure 4:
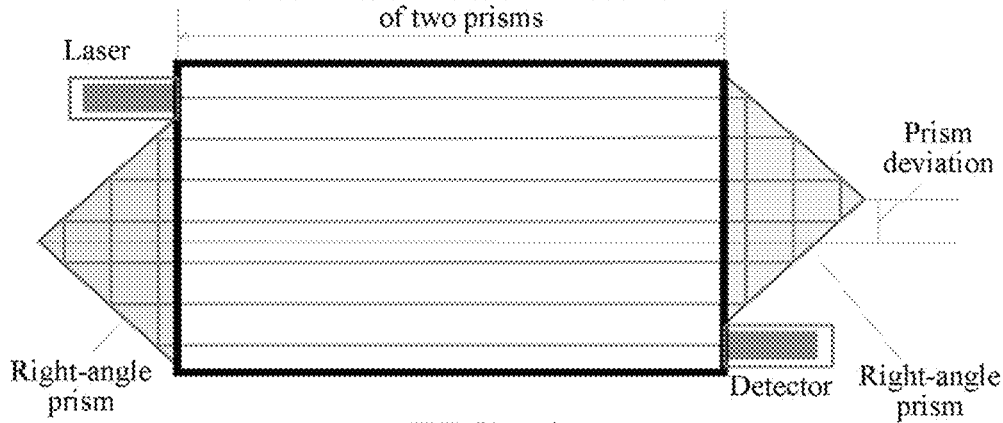
FIG. 4 and FIG. 5 are respectively a plane view and a side view of a first implementation of an optical path module in a photoelectric gas sensor probe provided by an embodiment of the present disclosure.
Figure 5:
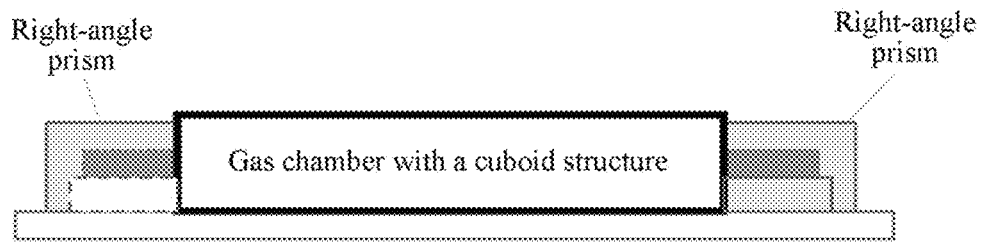

Referring to FIG. 4 and FIG. 5, in an optical path module, a parallel laser source 8 parallel to the center line of the prism is mounted beside a first right-angle triangular prism, that is, at an acute angle end of the right-angle triangular prism, and a photoelectric detector 10 is mounted at the other acute angle end of a second right-angle triangular prism. A focusing lens for focusing the parallel light on a detection sensitive surface is arranged in front of the photoelectric detector 10.

A parallel light beam emitted by the laser source 8 is parallel to the center line of the prism, and can be received and reflected by the second right-angle triangular prism. When a parallel laser beam is vertically irradiated on the inclined surface of the second right-angle triangular prism, the light beam is totally reflected by two right-angle surfaces of the second right-angle triangular prism, so as to form a first parallel reflected light beam parallel to an incident light beam. The light beam is vertically irradiated on the inclined surface of the first right-angle triangular prism after passing through the gas absorption chamber. Then, the light beam is totally reflected by two right-angle surfaces of the first right-angle triangular prism and passes through the absorption chamber, so as to form a second parallel reflected light beam. In this way, the parallel laser beam is reflected for multiple times sequentially by the two prisms, so as to form a group of two-dimensional parallel light beams After the light beam is reflected for the last time by the first right-angle triangular prism, the light beam reaches the photoelectric detector 10 through the absorption chamber, thereby forming a complete measurement optical path. These two-dimensional parallel light beams pass through the flat glass windows in two sides of the gas absorption chamber and enter the gas absorption chamber to form sensing light beams.

As an optional embodiment, the wavelength tunable laser source with a parallel light beam 8 has a built-in light intensity detector 10. Changes of the light intensity of the wavelength tunable laser source 8 can be measured by the built-in light intensity detector. The laser source may be a vertical cavity surface emitting laser (VCSEL) with low power consumption, or may be a distributed negative feedback laser (DFB). An output signal of the light intensity detector is directly proportional to the light intensity of an output light of the laser, and therefore, this signal can be used as a feedback signal for monitoring changes in light intensity of the laser and compensating for these changes.

The parallel light beam emitted by the laser source is reflected for multiple times by two right-angle triangular prisms, and enters or exits a gas chamber successively through two light-transmitting windows of the gas absorption chamber. After multi-reflections, the reflected light beam reflected for the last time by the prism passes through the absorption chamber, and is received by the photoelectric detector 10.

As an optional embodiment, the photoelectric gas sensor probe is further provided with an electronic processing circuit for modulating the wavelength of the laser source as well as amplifying and adjusting a measurement signal of the photoelectric detector 10.

Embodiment 2

Figure 6A:
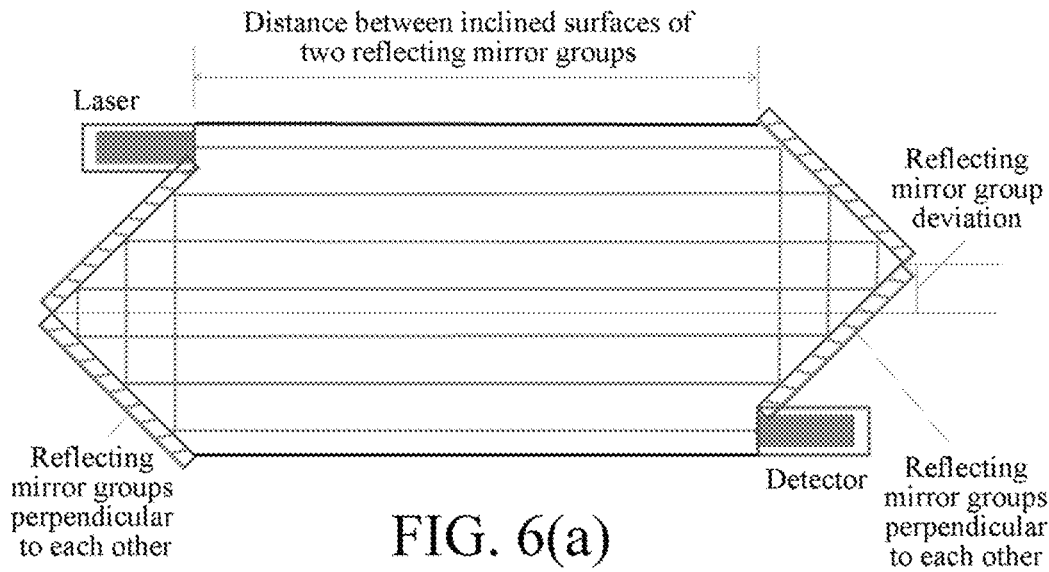
FIG. 6(a)-(b) are respectively a plane view and a side view of a second implementation of the optical path module in the photoelectric gas sensor probe provided by an embodiment of the present disclosure.
Figure 6B:
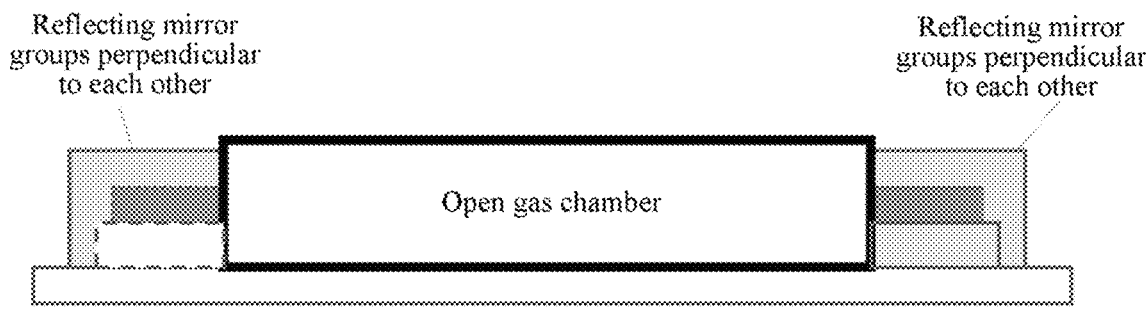

In one or more implementations, a two-dimensional multi-point-reflection long-optical-path gas sensor probe is disclosed. The differences between the structure of the sensor probe in this embodiment and that in Embodiment 1 lie in that: referring to FIG. 6(*a*)-(*b*), in this embodiment, two reflecting mirror pairs consisting of plane reflecting mirrors perpendicular to each other are adopted to replace reflecting surfaces of the two right-angle triangular prisms. A reflecting surface of a first reflecting mirror pair is provided with a laser source 8, and the other reflecting surface of the other reflecting mirror pair is provided with a photoelectric detector 10. A parallel light beam emitted by the laser source 8 is absorbed by the photoelectric detector 10 after being reflected for multiple times by the first reflecting mirror pair and the second reflecting mirror pair.

The remaining structure is the same as that of the two-dimensional multi-point-reflection long-optical-path gas sensor probe in Embodiment 1, and will not be repeated here.

Embodiment 3

Figure 7A:
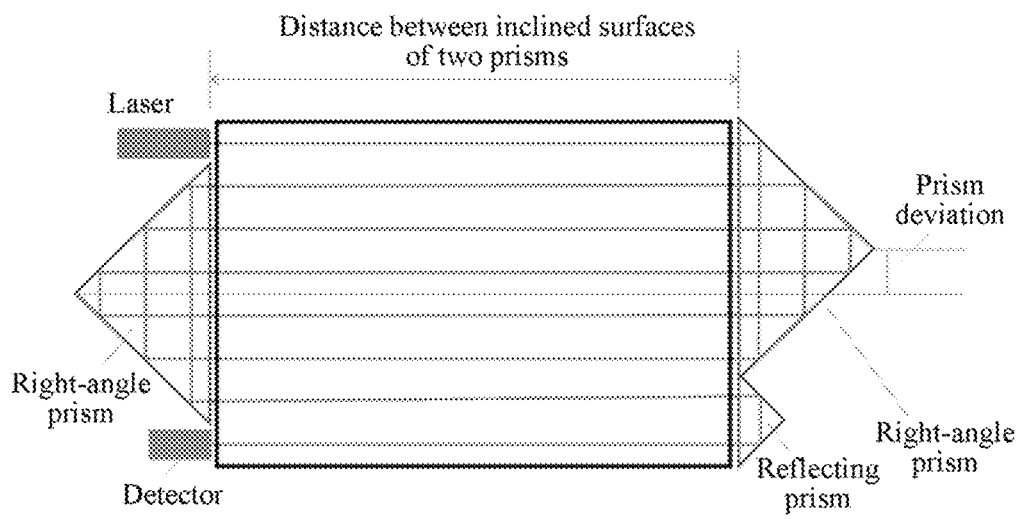
FIG. 7(a)-(b) are respectively a plane view and a side view of a third implementation of the optical path module in the photoelectric gas sensor probe provided by an embodiment of the present disclosure.
Figure 7B:
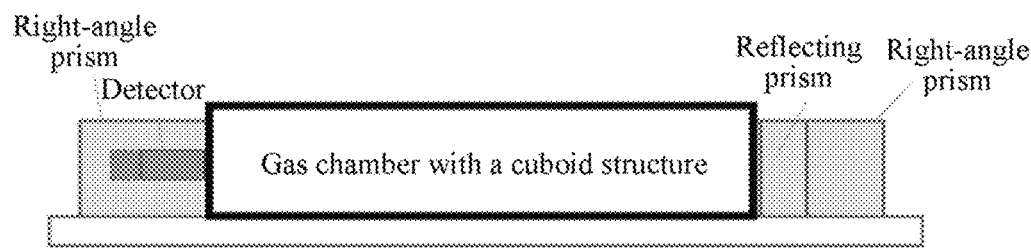

In one or more implementations, a two-dimensional multi-point-reflection long-optical-path gas sensor probe is disclosed. Referring to FIG. 7(*a*)-(*b*), the differences between the structure of the sensor probe in this embodiment and that in Embodiment 1 lie in that: in this embodiment, in two right-angle triangular prisms, an acute angle end of a first right-angle triangular prism is provided with a parallel laser source 8, and the other acute angle end is provided with a photoelectric detector 10. An acute angle end of a second right-angle triangular prism is provided with a third right-angle triangular prism. A parallel light beam emitted by the laser source 8 is absorbed by the photoelectric detector 10 after being reflected for multiple times by the first right-angle triangular prism, the second right-angle triangular prism and the third right-angle triangular prism.

In this structure, the laser source 8 and the photoelectric detector 10 can be placed at the same side of the gas absorption chamber. Therefore, corresponding light source driving circuit and signal processing circuit 6 can be placed at one end of the sensor probe, so as to make the overall design more compact.

It can be understood that the right-angle triangular prism in this embodiment can also be replaced by a reflecting mirror pair consisting of two plane reflecting mirrors perpendicular to each other, or other right-angle reflecting mirror pairs that can be conceived by those skilled in the art.

The remaining structure is the same as that of the two-dimensional multi-point-reflection long-optical-path gas sensor probe in Embodiment 1, and will not be repeated here.

Embodiment 4

Figure 8A:
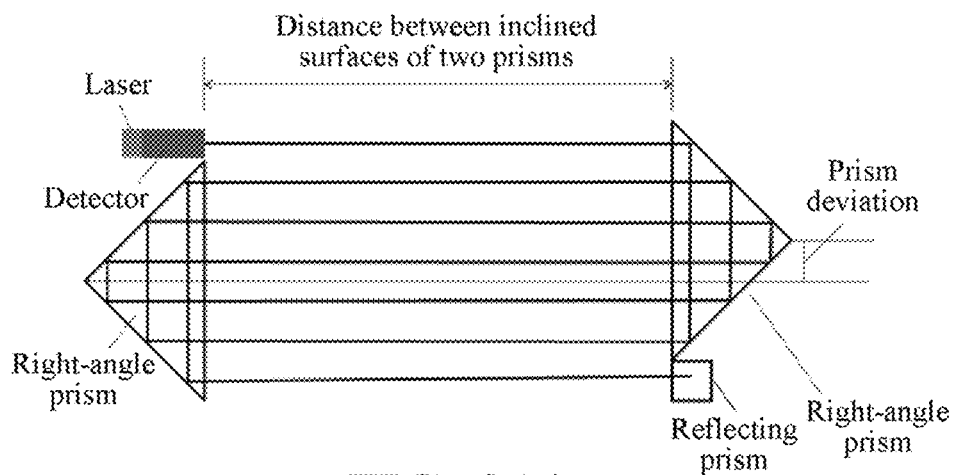
FIG. 8(a)-(b) are respectively a plane view and a side view of a fourth implementation of the optical path module in the photoelectric gas sensor probe provided by an embodiment of the present disclosure.
Figure 8B:
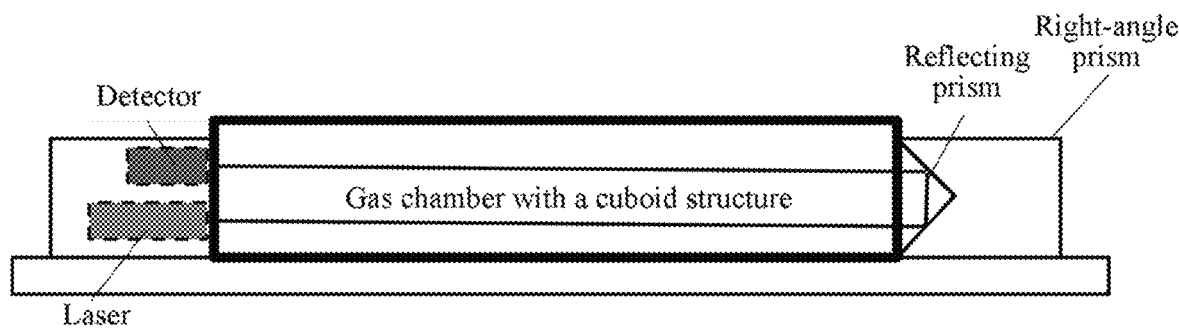

In one or more implementations, a two-dimensional multi-point-reflection long-optical-path gas sensor probe is disclosed. Referring to FIG. 8(*a*)-(*b*), the differences between the structure of the sensor probe in this embodiment and that in Embodiment 1 lie in that: in this embodiment, in two right-angle triangular prisms, an acute angle end of a first right-angle triangular prism is respectively provided with a laser source 8 and a photoelectric detector 10. A small reflecting prism is mounted at an acute angle end of a second right-angle triangular prism, and a reflecting surface of the reflecting prism is arranged along a direction perpendicular to the light beam.

After a parallel light beam emitted by the laser source 8 is reflected for multiple times by the first right-angle triangular prism and the second right-angle triangular prism, a first layer of parallel light beam group is formed. And then the reflected light beam from the first layer is reflected by two reflective surfaces of a vertical right-angle prism to enter a second layer of the light beam, and after the light beam is reflected for multiple times again by the second right-angle triangular prism and the first right-angle triangular prism, the second layer of parallel light beam group is formed, and the light beam in the second layer after multi-reflections is then received by the photoelectric detector 10.

This optical path design doubles the detection optical path of the sensor. Moreover, the light source and the photoelectric detector 10 are arranged at the same side of the gas absorption chamber and are adjacent, thereby simplifying the design of a circuit board.

It can be understood that the right-angle triangular prism in this embodiment can also be replaced by a reflecting mirror pair consisting of plane reflecting mirrors perpendicular to each other, or other right-angle reflecting mirror pairs that can be conceived by those skilled in the art.

The remaining structure is the same as that of the two-dimensional multi-point-reflection long-optical-path gas sensor probe in Embodiment 1, and will not be repeated here.

Embodiment 5

In one or more implementations, a gas sensor is disclosed, which uses any two-dimensional multi-point-reflection long-optical-path gas sensor probe disclosed in Embodiment 1 or Embodiment 2 or Embodiment 3 or Embodiment 4.

The specific implementations of the present disclosure are described above with reference to the accompanying drawings, but are not intended to limit the protection scope of the present disclosure. A person skilled in the art should understand that various modifications or deformations may be made without creative efforts based on the technical solutions of the present disclosure, and such modifications or deformations shall fall within the protection scope of the present disclosure.

What is claimed is:

1. A two-dimensional multi-point-reflection long-optical-path gas sensor probe, comprising:
   a protecting housing; and
   a multi-point total reflection type long-optical-path module arranged in the protecting housing, wherein
   the multi-point total reflection type long-optical-path module comprises two right-angle reflecting prisms or reflecting mirror pairs spaced at a set distance, and inclined surfaces of the right-angle reflecting prisms or reflecting mirror pairs are oppositely arranged and parallel to each other,
   a set deviation exists between center lines of the two right-angle reflecting prisms or reflecting mirror pairs, and the deviation can enable light beams parallel to the center lines to be reflected for a set number of times between the two right-angle reflecting prisms or reflecting mirror pairs, so as to form a two-dimensional parallel light beam group,
   a gas absorption chamber is arranged in a space between the inclined surfaces of the two right-angle reflecting prisms or reflection surfaces of the two reflecting mirror pairs, and light beams entering the gas absorption chamber in the parallel light beam group constitute sensing light beams of measured gas, and
   the two right-angle reflecting prisms or reflecting mirror pairs are respectively embedded in a rigid base, and then arranged in the protecting housing.

2. The two-dimensional multi-point-reflection long-optical-path gas sensor probe according to claim 1, wherein
   a right-angle reflecting prism is a right-angle triangular prism or a triangular reflecting mirror pair consisting of two plane reflecting mirrors perpendicular to each other,
   in the two right-angle reflecting prisms or reflecting mirror pairs, an acute angle end of a first right-angle reflecting prism or reflecting mirror pair is provided with a laser source, and an acute angle end of a second right-angle reflecting prism or reflecting mirror pair is provided with a photoelectric detector,
   a focusing lens for focusing the parallel light on a detection sensitive surface is arranged in front of the photoelectric detector,
   a parallel light beam emitted by the laser source is parallel to the center line of the right-angle reflecting prism or reflecting mirror pair, and can be received and reflected by the second right-angle reflecting prism or reflecting mirror pair, and
   the light beam is received by the photoelectric detector after being reflected for a set number of times.

3. The two-dimensional multi-point-reflection long-optical-path gas sensor probe according to claim 1, wherein
   a distance between the inclined surfaces of two right-angle reflecting prisms or reflecting mirror pairs and a third right-angle reflecting prism is set according to an optical path required by a gas sensor,
   in the two right-angle reflecting prisms or reflecting mirror pairs, an acute angle end of a first right-angle reflecting prism or reflecting mirror pair is provided with a laser source, and another acute angle end is provided with a photoelectric detector,
   an acute angle end of a second right-angle reflecting prism or mirror pair is provided with the third right-angle reflecting prism, which is arranged next to the second right-angle reflecting prism or mirror pair with an incident surface being parallel to an incident surface of the second right-angle reflecting prism or mirror pair, and
   a parallel light beam emitted by the laser source is received by the photoelectric detector after being reflected for multiple times by the first right-angle reflecting prism or reflecting mirror pair, the second right-angle reflecting prism or reflecting mirror pair, and the third right-angle reflecting prism.

4. The two-dimensional multi-point-reflection long-optical-path gas sensor probe according to claim 1, wherein
   a distance between inclined surfaces of two right-angle reflecting prisms or mirror pairs and a third reflecting prism is set according to an optical path required by a gas sensor,
   in the two right-angle reflecting prisms or reflecting mirror pairs, an acute angle end of a first right-angle reflecting prism or mirror pair is respectively provided with a laser source and a photoelectric detector, an acute angle end of a second right-angle reflecting prism or mirror pair is provided with the third reflecting prism, which is arranged next to the second right-angle reflecting prism or mirror pair with an incident surface being normal to an incident surface of the second right-angle reflecting prism or mirror pair, along a direction perpendicular to a light beam, and a parallel light beam emitted by the laser source is received by the photoelectric detector after being reflected for multiple times by the first right-angle reflecting prism or mirror pair, the second right-angle reflecting prism or mirror pair, and the third reflecting prism.

5. The two-dimensional multi-point-reflection long-optical-path gas sensor probe according to claim 1, wherein one side surface of the gas absorption chamber is provided with a number of vent holes, and after passing through a metal screen, the measured gas diffuses into the gas absorption chamber through the vent holes.

6. The two-dimensional multi-point-reflection long-optical-path gas sensor probe according to claim 5, wherein a sensor for detecting temperature and pressure in the gas absorption chamber is mounted in one of the vent holes.

7. The two-dimensional multi-point-reflection long-optical-path gas sensor probe according to claim 1, wherein four sides of an inner wall cavity of the gas absorption chamber are coated with a light-absorbing coating, and two sides of the gas absorption chamber are provided with windows for realizing entrance and exit of light beams, and the windows are treated with an anti-water condensation film.

8. A gas sensor, comprising:

the two-dimensional multi-point-reflection long-optical-path gas sensor probe according to claim 1.

* * * * *